US010040458B2

(12) United States Patent
Morley et al.

(10) Patent No.: US 10,040,458 B2
(45) Date of Patent: Aug. 7, 2018

(54) DEVICE FOR MEASURING THE STATE OF INTOXICATION OF A TEST SUBJECT

(71) Applicant: Dräger Safety AG & Co. KGaA, Lübeck (DE)

(72) Inventors: Stefan Morley, Lübeck (DE); Peter Michels, Lübeck (DE); Martin Zimmermann, Lübeck (DE)

(73) Assignee: Dräger Safety AG & Co. KGaA, Lübeck (DE)

( * ) Notice: Subject to any disclaimer, the term of this patent is extended or adjusted under 35 U.S.C. 154(b) by 137 days.

(21) Appl. No.: 15/023,050

(22) PCT Filed: Sep. 10, 2014

(86) PCT No.: PCT/EP2014/002444
§ 371 (c)(1),
(2) Date: Mar. 18, 2016

(87) PCT Pub. No.: WO2015/043717
PCT Pub. Date: Apr. 2, 2015

(65) Prior Publication Data
US 2016/0229413 A1 Aug. 11, 2016

(30) Foreign Application Priority Data

Sep. 24, 2013 (DE) .......... 10 2013 015 826

(51) Int. Cl.
*B60W 40/00* (2006.01)
*B60W 40/08* (2012.01)
(Continued)

(52) U.S. Cl.
CPC .......... *B60W 40/08* (2013.01); *B60K 28/063* (2013.01); *G06K 9/00255* (2013.01);
(Continued)

(58) Field of Classification Search
CPC .......... B60W 40/08; B60W 2040/0836; H04N 17/002; G06K 9/00255; G06K 9/00288; G06K 9/00845; B60K 28/063
See application file for complete search history.

(56) References Cited

U.S. PATENT DOCUMENTS 4,916,435 A * 4/1990 Fuller ................ G01N 33/4972
340/573.4
6,075,445 A * 6/2000 McLoughlin .......... A42B 3/046
340/573.1

(Continued)

FOREIGN PATENT DOCUMENTS

| EP | 1418082 A1 | 5/2004 |
| EP | 2 237 034 A1 | 10/2010 |
| EP | 2 390 129 A1 | 11/2011 |

OTHER PUBLICATIONS

International Search Report dated Dec. 9, 2014.

*Primary Examiner* — Hieu T Vo
*Assistant Examiner* — Sherman Manley
(74) *Attorney, Agent, or Firm* — McGlew and Tuttle, P.C.

(57) ABSTRACT

A device has a measuring device, in particular an alcohol-measuring device (3), for measuring the state of intoxication of a test subject and for generating a corresponding measured value. A camera (5) is provided for recording an image with the face of the test subject. A control unit (4) is configured to store the measured value together with the image in a memory unit (10). An analyzer (12) is configured such that the analyzer can identify a face and/or a defined, fixed pattern in the image. A follow-up action is triggered by the analyzer (12) when a face and/or pattern could not be identified.

20 Claims, 2 Drawing Sheets

(51) Int. Cl.
  *B60K 28/06*   (2006.01)
  *G06K 9/00*    (2006.01)
  *H04N 17/00*   (2006.01)

(52) U.S. Cl.
  CPC ..... *G06K 9/00288* (2013.01); *G06K 9/00845* (2013.01); *H04N 17/002* (2013.01); *B60W 2040/0836* (2013.01)

(56) References Cited

U.S. PATENT DOCUMENTS

| | | | |
|---|---|---|---|
| 6,167,746 B1 | 1/2001 | Gammenthaler | |
| 6,433,863 B1* | 8/2002 | Weiss | A61B 5/18 356/72 |
| 6,748,792 B1* | 6/2004 | Freund | B60K 28/063 180/272 |
| 7,432,973 B2* | 10/2008 | Iga | H04N 5/232 348/239 |
| 7,823,681 B2* | 11/2010 | Crespo | B60K 28/063 180/272 |
| 7,864,990 B2* | 1/2011 | Corcoran | G06K 9/00234 382/103 |
| 9,278,696 B2* | 3/2016 | Yi | B60W 40/08 |
| 2004/0100572 A1* | 5/2004 | Kim | H04N 5/23293 348/333.01 |
| 2006/0238362 A1 | 10/2006 | Mobley et al. | |
| 2006/0274936 A1* | 12/2006 | Ohkubo | G06K 9/00234 382/167 |
| 2008/0013799 A1* | 1/2008 | Steinberg | G06K 9/00228 382/118 |
| 2008/0069403 A1* | 3/2008 | Breed | B60K 28/066 382/104 |
| 2008/0170762 A1* | 7/2008 | Endo | G01N 33/4972 382/118 |
| 2009/0090577 A1* | 4/2009 | Takahashi | A61B 5/117 180/272 |
| 2009/0169068 A1* | 7/2009 | Okamoto | B60K 28/063 382/118 |
| 2009/0169069 A1* | 7/2009 | Kim | G06F 3/0317 382/124 |
| 2010/0012417 A1* | 1/2010 | Walter | B60K 28/063 180/272 |
| 2010/0251804 A1* | 10/2010 | Morley | B60K 28/063 73/23.3 |

* cited by examiner

DEVICE FOR MEASURING THE STATE OF INTOXICATION OF A TEST SUBJECT

CROSS REFERENCE TO RELATED APPLICATIONS

This application is a United States National Phase Application of International Application PCT/EP2014/002444 filed Sep. 10, 2014 and claims the benefit of priority under 35 U.S.C. § 119 of German Patent Application 10 2013 015826.5 filed Sep. 24, 2013, the entire contents of which are incorporated herein by reference.

FIELD OF THE INVENTION

The present invention pertains to a device for measuring the state of intoxication and especially the state of inebriation of a test subject, and especially of a test subject intended as a driver of a vehicle.

BACKGROUND OF THE INVENTION

In motorized vehicles, especially automobiles, trucks and buses, alcohol-measuring devices are used in combination with immobilizers to prevent a startup of the vehicles under the influence of alcohol. Such devices are also called (alcohol) interlock systems.

Interlock systems are known, in which, besides the alcohol-measuring device, a camera is provided, with which the test subject carrying out the measurement is photographed, and the measured result is stored together with the photo for documentation purposes (cf., for example, U.S. Pat. No. 6,748,792 B1).

A manipulation, which consists of a person who will not be the driver of the motor vehicle, which will then be able to be started, for example, a passenger, carrying out the measurement, can be revealed by means of such an interlock system, when an additional image of the driver is recorded during the drive subsequent to the alcohol measurement, and this image is compared with the image recorded during the alcohol measurement for personal identity (cf. EP 2 390 129 A1).

In addition, it is well known from EP 2 237 034 A1 that the manipulation of an interlock system can consequently be made difficult when it checks the presence of the alcohol-measuring device in a defined area of the camera field of view detecting the driver's seat during the measurement, and the release of the interlock system is linked to this condition. For this, an infrared signal, which must be detected by means of the camera within a defined camera image area, may be sent, for example, by the alcohol-measuring device. This design of an interlock system shall prevent an alcohol-measuring device, designed as a mobile hand-held device, from being used by a person other than the one sitting on the driver's seat.

When using a known interlock system having a camera, provisions are made for letting this system be read at regular service intervals, for example, monthly, in order to reveal manipulations during the measurements on the basis of the recorded and stored images. The problem with this is that it is detected comparatively late, only after the images recorded by the camera are such that identification of the persons recorded on the images, if present at all, is not possible. In particular, technical defects or a manipulation by the test subject or uncooperative behavior of the test subject may lead to the recorded images not allowing an identification. For example, the position of the camera may have been changed by manipulation or unintentionally, as a result of which this camera no longer records the predetermined area of the motor vehicle and thus also no longer the face of a test subject behaving basically as intended. Also, the camera may be out of focus, as a result of which only very blurred images not allowing a reliable personal identification were recorded and stored. On the other hand, the test subject may also elude a personal identification by shielding the subject's face in front of the camera. In both cases, it would be advantageous to be informed about the problems as early as possible in order to have the incorrect alignment or focusing of the camera corrected in the first case. The uncooperative behavior of the test subject in the second case could lead, on the other hand, to early sanctions against the corresponding users of the interlock systems which are routinely used within the framework of rehabilitation programs.

SUMMARY OF THE INVENTION

An object of the present invention is to improve a device for measuring the state of intoxication and in particular the state of inebriation of a test subject, in which a documentation of measurements of the state is carried out on the basis of images of the test subjects associated with the measured values. In particular, the usability of the documentation should be improved and/or the amount of maintenance required for the device should be reduced.

According to the invention a device of this type is provided which comprises (at least) one measuring device for measuring the state of intoxication of a test subject and for generating a corresponding measured value, (at least) one camera, which is provided for recording (at least) one image of the face of the test subject during the measurement, and (at least) one control unit configured to store the measured value determined by the measuring device together with the image in (at least) one memory unit. The device further comprises (at least) one analyzer which is configured to identify a face and/or a defined, fixed (fixed in relation to at least the camera at least during the period of the image recording) pattern in the image (overall or in a defined image area), wherein (at least) one follow-up action is triggered by the analyzer, when a face and/or pattern could not be identified. This is, in particular, a follow-up action, which differs from a follow-up action that is triggered by the device in case of an identifiable image.

"Intoxication" is defined according to the present invention as a personal status of the test subject with disturbances of consciousness, cognitive abilities, perception, emotion and behavior or other psychophysiological functions and reactions, as they occur especially after taking psychotropic substances (especially illegal drugs) and/or drinking alcohol.

A preferred embodiment of the device according to the present invention is used to measure a state of inebriation, in particular on the basis of the breath alcohol content, of the test subject, wherein the measuring device for this is configured as a (breath) alcohol-measuring device. A further preferred embodiment of the device according to the present invention is used to measure a state of drug intoxication, in particular after illegal drugs have possibly been taken. In this case, for example, a saliva test, which can be automatically analyzed, may be used.

"Identification of a face and/or of a defined pattern"—identification of a face, identification of a defined pattern or identification of both a face and a pattern is defined as the localization of an area of the image, in which a face of a test subject and/or the defined pattern is shown, wherein, in the case of the identification of a face, the quality of the imaging shall be such that an association of the face shown in the image with a real person is possible at least manually, i.e., by a person, by means of visual comparison or preferably by means of automatic comparison or will be possible at a later point in time. A personal identification, such that a personal identity is established on the basis of an automatic comparison of the face identified in the image to be analyzed with a face of a defined person in a reference image, is possible, but not necessary. In this connection, a defined pattern is preferably localized in a predefined area of the image.

The test subject may especially be a driver of a vehicle, vehicles according to the present invention being defined as all and any, especially motor-driven landcraft, watercraft and aircraft. In this case, the driver is defined as that person who is positioned during the measurement at a place provided for the steering of the vehicle during operation, for example, a driver's seat. The device according to the present invention may, in addition, be used for checking access for a restricted area, such as, for example, a certain section or a room in a chemical plant or military installation, to which the test subject would like to gain access. An additional application for the device according to the present invention may be in so-called home monitoring systems, in which a permanent or temporary alcohol and/or drug abstinence is checked by the routine discharge of a sample, especially a breath alcohol and/or saliva sample, wherein a notification is transmitted to a monitoring site if a limit value for the breath alcohol content and/or the drug parameters to be detected is exceeded.

The "image," which is recorded by the camera and analyzed by the analyzer, may be a single image (photo) or a "sequence of images" (video).

The components of the device according to the present invention, i.e., at least the measuring device, the camera, the control unit and the analyzer, if provided, may communicate with one another and be connected correspondingly in a wired or wireless manner. In this connection, the corresponding connection may be provided permanently or even only temporarily. For a wireless communication, the device may have one or more data transmission devices.

Provisions may be made for especially the analyzer to be arranged either within, i.e., as part of the vehicle, or outside, i.e., independent of said vehicle, in the preferred use of the device in association with a vehicle. The corresponding arrangement of the analyzer may especially depend on follow-up actions, which are provided when no identification of a face and/or pattern in an image is possible. For follow-up actions, which have a direct consequence on the manner of functioning of the device, for example, a measurement to be repeated in case of an impossible or unsuccessful identification of a face and/or pattern in the corresponding image, an arrangement of the analyzer (or at least one of a plurality of analyzers) within the vehicle may be advantageous. If the control unit is connected to the analyzer in a communicating manner via a wireless connection (GSM, etc.), an arrangement of the analyzer outside of the motor vehicle may, however, be provided even in case of such follow-up actions. If follow-up actions are provided primarily or exclusively after a reading of the memory unit within the framework of a routine service, the analyzer may preferably be arranged outside of the vehicle, since such an individual analyzer can be utilized in connection with a plurality of vehicles and the components of the device installed there. The analyzer may then preferably communicate with the corresponding control unit by means of an only temporarily connected cable, as a result of which the high cost for a wireless data transmission can be avoided.

A follow-up action in case of an impossible identification of a face and/or pattern may be that an error associated with this impossible identification is determined by the analyzer and stored in the memory unit and/or the analyzer.

In particular, provisions may be made for a checking of the camera field of view, of a contrast range of the image and/or of a brightness range of the image to be carried out, when a face and/or pattern could not be identified in the image. Technical problems as well as specific manipulative reasons, which have led to the unsuccessful identification, can consequently be identified.

In particular, an incorrect alignment of the camera may be detected by means of a checking of the camera field of view. Such a checking of the camera field of view is made possible, for example, by means of a comparison of the image to be analyzed with a reference image (reference image data) preferably stored in the control unit and/or in the analyzer. In this connection, it is possible, for example, to compare whether one or more markers shown in the reference image, which are arranged such that they are not concealed by the test subject during a stay in a position provided for the carrying out of the measurement, can be detected in the image to be analyzed in essentially the same position as in the reference image. The marker or markers may be elements, which were arranged for this purpose in the camera field of view or even specific contours of elements arranged primarily for other reasons in the camera field of view, for example, a (part of a) driver's seat of a motor vehicle. In this case, the markers may be configured as passive or even active, for example, in the form of an infrared light source.

As an alternative or in addition to a comparison of the recorded image with a reference image, provisions may also be made, however, to determine an incorrect alignment of the camera on the basis of one or more position sensors.

An incorrect focusing of the camera and/or an optical impairment due to a filter can be detected, in particular, by means of a checking of the contrast range of the image in a manner known from conventional digital cameras. In this case, the filter may prove, for example, to be contamination of a camera lens or even as a camera lens taped by means of a (partially) transparent adhesive tape. In this case, a comparison of the image to be analyzed with a reference image may also be helpful for the analysis.

A glare may be detected by means of a checking of the brightness range of the image in particular in a manner known from conventional digital cameras. Such a glare may occur, for example, by manipulation by shining a light on the camera during the measurement by means of a flashlight or an infrared LED. A comparison of the image to be analyzed with a reference image may also be helpful in this case.

In a preferred embodiment of the device according to the present invention provisions may be made for at first the alignment of the camera, the contrast range and/or the brightness range of the image to be checked by means of a (possible or impossible) identification of a pattern. This may also take place independently of the measurement of the state of intoxication. If this analysis is indicative of a correctly adjusted camera, a subsequent, impossible identification of a face in an image is more likely indicative of a manipulative behavior of the test subject. This is true, in particular, when an identification of a face is repeatedly not possible.

If an error for the unsuccessful identification of a face and/or pattern was determined, provisions may be made, as a further follow-up action, for this error to be stored in the memory unit and/or the analyzer. This may make it possible to fix the error or errors within the scope of a service of the device with comparatively little effort. In this case, provisions may also be made that a storing of such an error in the memory unit may lead to an intended service interval, which can basically be provided for reading the memory unit and can be defined, in particular, on the basis of a specific period and/or a specific number of usage operations of the device (and thus, for example, starting attempts for a vehicle provided with the device), being shortened. It can consequently be ensured that an error, which can permanently or at least frequently cause an inability to identify a face and/or pattern in the recorded images, is fixed in the short term. Thus, a statistical analysis of the stored error may be provided for this purpose.

A shortening of an intended service interval for reading the memory unit may basically be provided as a follow-up action, when a face and/or pattern cannot be identified in a recorded image. Each impossible identification may involve a defined shortening in this connection. However, provisions may also be made for such a shortening to be provided only after a defined number of impossible identifications. Here as well, a statistical analysis of the impossible identifications, which can be stored as incidents, can thus be provided.

If a correspondingly configured camera is provided, a determination of an incorrect alignment and/or of an incorrect focusing may also lead to an automatic readjustment, i.e., in particular realignment and/or refocusing. Such an automatic readjustment of the camera may especially also take place independently of a measurement of the state of intoxication and of an attempted identification of a face and/or pattern in this case. The camera may have, for example, a correspondingly adjustable design for this purpose, which can take place especially by means of so-called piezoelectric motors, which are known from lenses of conventional digital cameras. Also in case of an automatic realignment and/or refocusing of the camera, provisions may be made to store a determined incorrect alignment of the camera as an error in the memory unit. A frequent misalignment of the camera within a service interval may then be considered to be an indication of a technical defect or manipulation attempts.

A further follow-up action triggered in case of an unsuccessful identification of a face and/or pattern may be that the image is not stored in the memory unit. Thus, provisions may be made for the measurement to be considered valid only in case of an identification of a face and/or pattern in the image. As a reaction to the validity of the measurement—assuming a sufficiently low state of intoxication determined by the measurement—a blocking of the starter device (e.g., a starter motor of an internal combustion engine or a relay of a traction network of an electrified vehicle) of a vehicle can then preferably be released, so that the vehicle can be put into operation, or an access barrier can be released and thus an access requested by the test subject can be granted. If, on the other hand, it is determined by the control unit that a face and/or pattern cannot be identified in the image, provisions may be made for a blocking of a starter device of a vehicle or an access barrier not to be released.

As an alternative or in addition hereto, provisions may be made, as a follow-up action, for a notification to be issued when an identification of a face and/or pattern in the image is not possible. For example, the test subject can be informed of the impossible identification with this notification. When a blocking of a starter device of a vehicle is released at the same time, such a notification has an essentially informative nature.

However, provisions may preferably also be made for the notification to include a request to repeat the measurement, which may be particularly useful when a blocking of a starter device of a vehicle or an access barrier is not released because of a missing identification of a face and/or pattern.

Based on this, provisions may, furthermore, be made for a further follow-up action to be triggered after a defined number of repeated measurements. This follow-up action may be especially the determination of one or more errors for the unsuccessful identification. It may be advantageous in this case for the determination of the error or errors for the unsuccessful identification, which determination is often calls for complicated computations and is used, in particular, for revealing a technical defect or a manipulation, to be triggered only after several, consecutive failed attempts. Isolated reasons for the unsuccessful identification, for example, a non-manipulative turning away of the face by the test subject, do not then lead directly to the triggering of an error determination. This may be especially advantageous when the analyzer is not installed in the vehicle in case of a device provided for a vehicle, but rather communicates with this device, for example, in a wireless manner.

Optionally, provisions may be made to improve the identifiability of a face and/or pattern during a measurement when more than one camera is used, each of which delivers an image. In this case, the cameras can be provided redundantly, so that each of them delivers a separate image that can be analyzed. However, provisions may also be made to bring together the images of the camera using a computer (so-called "stitching"). In this case, the cameras may preferably be aligned (with regard to their direction of view) at an angle (i.e., not parallel) and especially at right angles to each other.

The present invention is explained in detail below on the basis of exemplary embodiments shown in the drawings. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
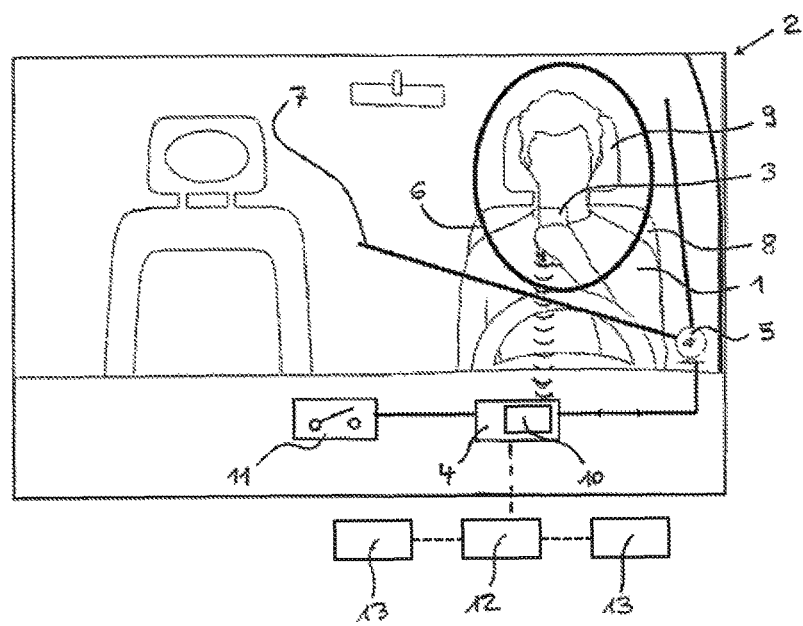
FIG. 1 is a view showing first embodiment of a device according to the present invention for measuring the state of inebriation of a driver of a vehicle.

FIG. 1 schematically shows a first embodiment of a device according to the present invention for measuring the state of inebriation of a driver 1 of a vehicle 2.

The device comprises an alcohol-measuring device 3, which is designed in the known manner (cf., for example according to U.S. Pat. No. 6,167,746 B1), such that this device measures an alcohol content in the breath of a test subject who is the driver 1 of the vehicle 2. The measured value resulting from a measurement is transmitted to a control unit 4 of the device installed in the vehicle 2. This may take place in a wired manner or, as in the present exemplary embodiment, in a wireless manner by means of, for example, any radio transmission (e.g., Bluetooth®). The device comprises, furthermore, a digital camera 5, which is provided for recording an image comprising the face of the driver 1 during the measurement by means of the alcohol-measuring device 3. In this case, the camera 5 is arranged and aligned in a predefined manner such that an internal image area 6 of the camera field of view 7 detects an area of the interior space of the vehicle 2, in which the head of the driver 1 is expected to be. Specifically, the internal image area 6 is aligned on the upper part of the driver's seat 8 and in particular the head restraint 9 of the driver's seat 8. A focusing is predefined in this case such that an area at a defined distance in front of a head restraint 9 is focused. As a result, images of the face of the driver 1 that are as high quality as possible shall be recorded.

The camera 5 is connected to the control unit 4 via a cable connection. The control unit 4 controls the camera 5 such that this camera records an image at the correct point in time. Vice versa, the corresponding image may then be stored in a memory unit 10 of the device which is integrated into the control unit 4. The storage takes place in this case such that an association with the corresponding measured value transmitted by the alcohol-measuring device 3 is given.

If the result of the measurement of the breath alcohol content shows that this content lies below a limit value stored in the control unit 4, the control unit 4 releases a starter device 11, for example, the starter motor of an internal combustion engine of the vehicle 2. The vehicle 2 can thus be put into operation.

The device shall be serviced in a service station provided for this at regular service intervals which are defined, for example, on the basis of a specific period. In this connection, the data stored in the memory unit 10 are transmitted in a wireless manner or via a cable temporarily connected to an analyzer 12 of the device not installed in the vehicle 2. In the analyzer 12, the images transmitted from the memory unit 10 are checked by means of an algorithm as to whether an identification of the face of the driver 1 is possible and, if so, whether the identified face is located in a section of the corresponding image that corresponds to the internal image area 6. The result of this checking is documented, and provisions may be made for only the results: "identification of a face in the internal image area 6" and "no identification of a face in the internal image area" or additionally also an "identification of a face not arranged in the internal image area 6" to be documented.

Subsequently, the number $n_B$ of images, on which a face in the internal image area 6 was identified, as well as the number k of images, on which no face in the internal image area 6 could be identified, is determined. Their ratio V can be determined based on $V=k/n_B$.

Depending on whether the determined value for k and/or V exceeds a corresponding, predefined limit value, one or more follow-up actions may be triggered by the analyzer.

On the one hand, a notification may be issued to a service technician performing the service. This notification may indicate to the service technician that the camera 5 of the device could be defective, incorrectly aligned or incorrectly focused. The service technician should use this as an opportunity to check the function, alignment and focusing of the camera within the framework of the service.

Moreover, a notification may be transmitted to one or more data processing systems. 13. In this case, besides the message that a limit value for k and/or V was exceeded, the specific numbers $n_B$ and k as well as the corresponding images may also be transmitted. One of the data processing systems 13 may be a central data processing system, in which the data generated by a plurality of devices according to the present invention are stored centrally and optionally further processed. Another data processing system 13 may be a reporting system of an authorized site, which is, for example, responsible for monitoring the user (who may be the driver 1) of the device used within the framework of a rehabilitation program.

An error determination can be made in the analyzer 12 based on the images, on which no face is identifiable in the internal image area 6. In this case, based on an analysis of the contrast range, the brightness range and the camera field of view, possible errors may be identified, which have led to no face being able to be identified in the internal image area 6 in the individual images. By means of an analysis of the contrast range, it can be determined, in particular, whether the camera 5 is incorrectly focused or whether a camera lens is contaminated or is not free for other reasons (e.g., due to taping with a partially transparent adhesive tape). It can be determined based on an analysis of the brightness range, for example, whether the camera 5 was subjected to glare at the time of the recording of the image, which may have been carried out in a manipulative manner by illuminating by means of a flashlight or an infrared LED or even unintentionally due to secondary illumination, for example, by another vehicle. By means of an analysis of the camera field of view, an incorrect alignment of the camera may, in particular, be determined.

The result of the analysis can be issued in the form of one or more notifications to the technician performing the service or transmitted to one or more of the data processing systems 13. As a result, a service of the device can be supported, or a likely manipulative or uncooperative behavior of the driver 1 can be identified.

Figure 2:
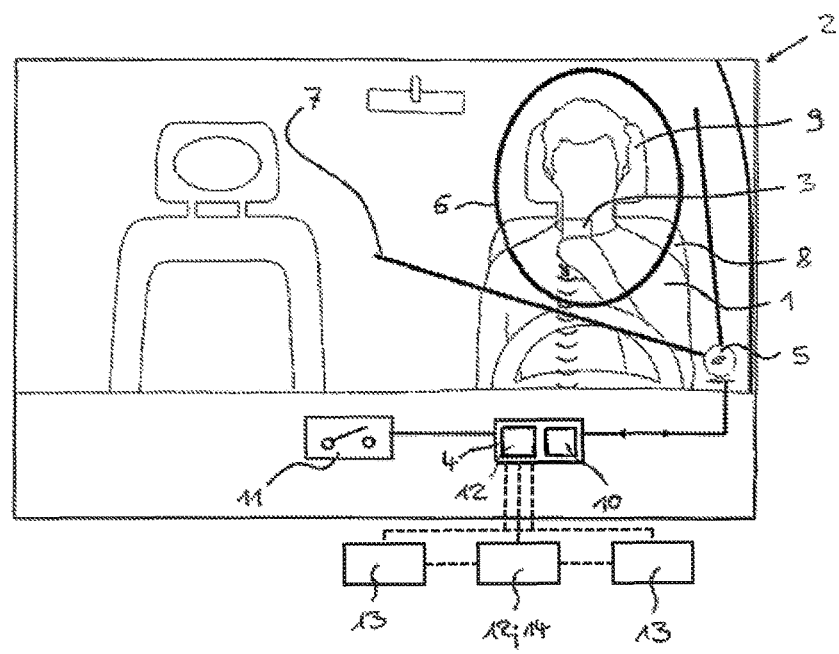
FIG. 2 is a view showing a second embodiment of a device according to the present invention for measuring the state of inebriation of a driver of a vehicle.

The embodiment of a device according to the present invention shown in FIG. 2 differs from the embodiment of a device according to the present invention shown in FIG. 1 especially in the fact that a (first) analyzer 12 is integrated into the control unit 4. Corresponding to the embodiment according to FIG. 1, the analyzer 12 is capable of checking the images stored in the memory unit 10 by means of an algorithm as to whether an identification of a face of the corresponding driver 1 is possible and, if so, whether the identified face is located in a section of the corresponding image corresponding to the internal image area 6 of the camera 5. The result of this checking is likewise documented.

If no identification of a face is possible in the internal image area 6 in a measurement, provisions may be made for a notification to be issued by means of the control unit 4 to the driver 1 and for this driver 1 to be requested to repeat the measurement. In this case, provisions can thus be made for the starter device 11 to be released only if a measurement with an identifiable image is present or at least multiple attempts were made to provide a corresponding measurement.

As an alternative, provisions may also be made for a corresponding notification and request to be issued only when a defined number of images, in which no identification of a face is possible in the internal image area 6, has been reached. For this, the analyzer 12 may integrate a counter, which gives an account of the total number of corresponding images. When the reading of the counter has increased by a defined number, the corresponding notification and request are issued. Accordingly, provisions may be made for the starter device 11 to be released also when a measurement without an identifiable image is present, but the counter reading has not yet increased corresponding to the defined number. If, on the other hand, an increase in the counter reading by the defined number is reached, provisions may be made for the starter device 11 to be released only if a measurement with an identifiable image is present or at least multiple attempts were made to provide a corresponding measurement.

A time limit, within which an identification must be made in the corresponding image, may also be set in all embodiments. This may be especially useful when the corresponding image is not present as an individual image but rather as a sequence of images (video).

It is likewise possible to issue an identification made of a face in the internal image area 6 as a notification to the driver 1, and the notification may also be carried out in the form of a simple sound signal or a light signal.

Furthermore, a limit value may be stored in the analyzer 12 or the memory unit 4. If the reading of the counter has reached or exceeded the limit value, this can be stored in the analyzer 12 or memory unit 10 as an event and/or can be issued as a notification directed at the driver 1. Furthermore, this event may be transmitted directly, especially in a wireless manner (e.g., by means of GSM—Global System for Mobile Communications (cellular phone technology)) to a first and/or second data processing system 13, as they were already described based on the exemplary embodiment of FIG. 1. Provisions may likewise be made for a defined service interval to be shortened in order to be able to carry out a service of the device for fixing errors and optionally a further analysis of the images in a timely manner.

The counter is reset in a service. At the same time, the analysis of the images, which was already described on the basis of FIG. 1, with the goal of determining an error or the determination of a manipulative or uncooperative behavior of the test subjects, can be carried out by means of a second analyzer 12, which is connected to the control unit only temporarily during the service. Provisions may be made, as an alternative, for this analysis to be carried out by means of the (first) analyzer 12 integrated into the control unit, for which this (first) analyzer 12 would have to be equipped with correspondingly sufficient computing power. The analysis could then only still be read by means of a reader 14 during the service.

The components shown separated from one another in the figures may have a partly integral design. In particular, provisions may be made to integrate the memory unit 10 and/or the (first) analysis unit 12 into the camera 5. The data may be stored in the device either briefly or—preferably—semi-permanently.

While specific embodiments of the invention have been shown and described in detail to illustrate the application of the principles of the invention, it will be understood that the invention may be embodied otherwise without departing from such principles.

The invention claimed is:

1. A device comprising:
   a measuring device for measuring a state of intoxication of a test subject and for generating a corresponding measured value;
   a camera for recording an image including a face of the test subject;
   a control unit configured to store the measured value together with the image in a memory unit; and
   an analyzer configured to analyze the image to determine whether it is possible to identify that a face is present in the image and to trigger a follow-up action by the analyzer when the determination is made that an identification of the presence of a face in the image is not possible and the analyzer is configured to determine a no face present error associated with the not possible identification of the presence of a face in the image and to store the no face present determined error in the memory unit or the analyzer or in both the memory unit and the analyzer.

2. A device in accordance with claim 1, wherein a checking of a camera field of view or a checking of a contrast range of the image or a checking of a brightness range of the image or any combination of a checking of the camera field of view, a checking of a contrast range of the image and a checking of a brightness range of the image is carried out when the determination is made that an identification of the presence of a face in the image is not possible.

3. A device in accordance with claim 2, wherein an automatic readjustment of the camera occurs in case of the detection of an error with regard to the camera field of view or the contrast range or both the camera field of view and the contrast range.

4. A device in accordance with claim 1, wherein the determination as to identification comprises a comparison of the image with a reference image.

5. A device in accordance with claim 1, wherein the image is not stored in the memory unit when the determination is made that an identification of the presence of a face in the image is not possible.

6. A device in accordance with claim 1, wherein a notification is issued when the determination is made that an identification of the presence a face in the image is not possible.

7. A device in accordance with claim 5, wherein the notification comprises a request for repeating the measurement.

8. A device in accordance with claim 1, wherein a further follow-up action is triggered after a defined number of unsuccessful identifications, or stored errors or repeated measurements or any combination of unsuccessful identifications, stored errors and repeated measurements.

9. A device in accordance with claim 1, wherein a service interval for reading the memory unit is defined in advance and the service interval is shortened when the determination is made that an identification of the presence of a face in the image is not possible.

10. A device in accordance with claim 2, wherein the checking comprises a comparison of the image with a reference image.

11. A vehicle interlock system comprising:
    a measuring device measuring breath alcohol content or bodily fluid alcohol or drug content or an indication of bodily fluid alcohol or drug content of a test subject and generating a corresponding measured value;
    a camera connected to a vehicle and recording an image including a face of the test subject seated at a location in the vehicle;
    a control unit with an associated memory, the control unit being connected to the measuring device and being connected to the camera and being configured to store the measured value together with the image in a memory unit;
    an analyzer connected to the control unit and configured to analyze the image to identify whether a face image is present in a localized area of the image and to determine whether an identification of the face of the face image present in the image is possible, based on quality of the imaging, and to trigger a follow-up action by the analyzer when the determination is made that a face image is not present, wherein the follow-up action by the analyzer comprises generating a no face present error and storing the no face present error in the analyzer or in the memory unit or in both the memory unit and the analyzer.

12. A vehicle interlock system in accordance with claim 11, wherein the analysis of the image to determine whether a face image is present in the image comprises a comparison of the image with reference image data.

13. A vehicle interlock system in accordance with claim 12, wherein the follow-up action by the analyzer further comprises generating a signal resulting in the generation of a notification or generating a signal resulting in a blocking of the starter device of a vehicle or a continuation of a blocking of a starter device of the vehicle.

14. A vehicle interlock system in accordance with claim 12, wherein the follow-up action by the analyzer comprises a checking of a camera field of view or a checking of a contrast range of the image or a checking of a brightness range of the image or any combination of a checking of the camera field of view, a checking of a contrast range of the image and a checking of a brightness range of the image.

15. A vehicle interlock system in accordance with claim 14, wherein the control unit is configured for an automatic readjustment of the camera upon a detection of an error with regard to the camera field of view or the contrast range or both the camera field of view and the contrast range.

16. A vehicle interlock system in accordance with claim 12, wherein the follow-up action by the analyzer comprises deleting the image from the memory unit.

17. A vehicle interlock system in accordance with claim 13, wherein the notification comprises a request for repeating the measurement.

18. A vehicle interlock system in accordance with claim 13, wherein a further follow-up action is triggered after a defined number of no face present errors have been generated, or have been stored or after repeated measurements or any combination of no face present errors generated, stored errors and repeated measurements.

19. A vehicle interlock system in accordance with claim 12, wherein:
  a service interval for reading the memory unit is predefined or a service interval for servicing the vehicle interlock system is predefined; and
  the follow-up action by the analyzer comprises a shortening of the service interval for reading the memory unit or a shortening of the service interval for servicing the vehicle interlock system.

20. A device in accordance with claim 1, wherein determining whether it is possible to identify that a face is present in the image comprises a localization of a face image area of the image, in which a face image of a test subject is to be shown and the analyzer is further configured to determine an image quality of the face image area of the image if a face image is present and to determine whether an identification of a person's face of the face image present in the area of the image is possible, based on the image quality of the face image area of the image.

* * * * *